United States Patent
Gutowski

(10) Patent No.: US 6,411,819 B1
(45) Date of Patent: Jun. 25, 2002

(54) METHOD OF MODELING A NEIGHBOR LIST FOR A MOBILE UNIT IN A CDMA CELLULAR TELEPHONE SYSTEM

(75) Inventor: Stanley J. Gutowski, Arlington, VA (US)

(73) Assignee: ScoreBoard, Inc., Herndon, VA (US)

( * ) Notice: Subject to any disclaimer, the term of this patent is extended or adjusted under 35 U.S.C. 154(b) by 0 days.

(21) Appl. No.: 09/196,022

(22) Filed: Nov. 19, 1998

(51) Int. Cl.$^7$ ................................................. H04Q 7/20
(52) U.S. Cl. ...................................... 455/525; 455/436
(58) Field of Search ................................. 455/436, 437, 455/439, 442, 447, 450, 69, 62, 522, 63, 524, 67.3, 525, 512, 446; 370/331, 332, 334, 335, 338, 311, 329, 252, 342, 441; 375/130

(56) References Cited

U.S. PATENT DOCUMENTS

| | | | |
|---|---|---|---|
| 4,866,788 A | * 9/1989 | Mouly et al. | 455/9 |
| 5,471,670 A | * 11/1995 | Hess et al. | 455/437 |
| 5,577,022 A | * 11/1996 | Padovani et al. | 370/332 |
| 5,640,414 A | * 6/1997 | Blakeney, II et al. | 375/200 |
| 5,673,307 A | * 9/1997 | Holland et al. | 455/436 |
| 5,729,542 A | * 3/1998 | Dupont | 370/346 |
| 5,745,480 A | * 4/1998 | Behtash et al. | 370/252 |
| 5,784,360 A | * 7/1998 | Chih-Lin I et al. | 370/252 |
| 5,878,328 A | * 3/1999 | Chawla et al. | 455/67.1 |
| 5,881,368 A | * 3/1999 | Grob et al. | 455/69 |
| 5,884,196 A | * 3/1999 | Lekven et al. | 455/574 |
| 5,926,470 A | * 7/1999 | Tiedemann | 370/334 |
| 5,949,776 A | * 9/1999 | Mahany et al. | 370/338 |
| 6,021,329 A | * 2/2000 | Kornestedt et al. | 455/446 |
| 6,044,249 A | * 3/2000 | Chandra et al. | 455/456 |
| 6,108,364 A | * 8/2000 | Weaver, Jr. et al. | 375/130 |
| 6,232,909 B1 | * 5/2001 | Masciulli | 342/13 |
| 6,249,252 B1 | * 6/2001 | Dupray | 342/450 |

* cited by examiner

*Primary Examiner*—Nay Maung
*Assistant Examiner*—Jean A. Gelin
(74) *Attorney, Agent, or Firm*—Zito & Grandinetti; Joseph J. Zito; Kendal M. Sheets

(57) ABSTRACT

A computer implemented process which determines those base stations which most probably communicate with a mobile unit, determines a probability for each base station to communicate with a mobile unit at a location based on the actual received signal level compared to the interference level of signals received at the location, then computes for each set of base stations a probability of that set of base stations communicating.

17 Claims, 7 Drawing Sheets

| Pilot | Ec/Io | p(X) | pn(X) |
|---|---|---|---|
| A | -8 | 0.95 | 0.95 |
| B | -10 | 0.92 | 0.92 |
| C | -13 | 0.60 | 0.58 |
| D | -15 | 0.21 | 0.12 |

| P(X) | CD | C'D | CD' | C'D' |
|---|---|---|---|---|
| AB | 0.000 | 0.089 | 0.505 | 0.276 |
| A'B | 0.007 | 0/004 | 0.022 | 0.015 |
| AB' | 0.012 | 0.006 | 0.036 | 0.024 |
| A'B' | 0.001 | 0.000 | 0.002 | 0.001 |

Fig. 5

METHOD OF MODELING A NEIGHBOR LIST FOR A MOBILE UNIT IN A CDMA CELLULAR TELEPHONE SYSTEM

BACKGROUND OF THE INVENTION

1. Field of the Invention

This invention relates to cellular telephone systems and, more particularly, to processes for determining those base stations with which a mobile unit should communicate in code division multiple access (CDMA) cellular telephone systems.

2. History of the Prior Art

Presently available commercial mobile communication systems typically include a plurality of fixed base stations (cells) each of which transmits signals to and receives signals from mobile units within its communication area. Each base station in a CDMA system communicates with mobile units by sending digital transmissions over the same frequency spectrum. In most cellular systems, especially those with cells in urban areas carrying heavy traffic, each base station may be further divided into two or three sectors each of which may include its own transmission equipment the antennas of which provide 180 or 120 degree coverage, respectively. When the term base station is used herein, both sectors and cells are intended unless the context indicates otherwise.

A CDMA system transmits messages digitally. All transmissions in a CDMA system are on the same frequency spectrum so the digital signals constituting each message must somehow be recognizable from all of the possible transmissions available. To accomplish this, the digital messages are encoded by a series of overlaid digital codes. One of these codes, called a pseudorandom noise (PN) code, is applied to all transmissions throughout a CDMA system. The PN code is used to encode the individual bits of the original message at the transmitter and to decode the encoded message at the receiver. In order to recognize messages from a particular base station, each base station uses a distinct time offset (called a PN offset) from some repeating initial time to begin encoding the transmission using the PN code. Thus, one base station may begin an encoded transmission at the initial time, a second base station at an offset of one unit from the initial time, a third at an offset of two units from the initial time, and so on up to a total of 512 offsets.

Each transmission between a mobile unit and a base station is also placed on what is effectively a separate channel by further encoding the transmission with one of a plurality of Walsh codes. A message encoded by a Walsh code, as with a PN code, can only be decoded by the same Walsh code at the receiver. Thus, an encoded transmission on a particular channel is decoded by applying a mask including both the Walsh and PN codes to the received pattern of information bits commencing at the PN offset designated for the particular base station.

A base station normally has sixty-four Walsh codes available for defining channels on which it can establish transmissions with mobile units. Certain of these channels are preassigned to function as control channels. For example, in order to advise mobile units of the particular PN offset used, each base station continuously broadcasts the PN code using its assigned PN offset on one of these channels (a pilot channel) defined by Walsh codes. Mobile units monitor this preassigned pilot channel. When a mobile unit finds an offset at which a pilot is decodable, it refers to another control channel (a synchronization channel) to determine the initial time and thereby identify the PN offset of the base station. Each system also maintains a paging channel upon which indications are posted that new messages are arriving. A total of nine channels are provided for these and other control functions.

In order to allow mobile units to transmit and receive telephone communications as the units travel over a wide geographic area, each base station is normally physically positioned so that its area of coverage is adjacent to and overlaps the areas of coverage of a number of other base stations. When a mobile unit moves from an area covered by one base station to an area covered by another base station, communication with the mobile unit is transferred (handed oM from one base station to another base station in an area where the coverage from different base stations overlaps.

In most other types of cellular communication systems, a mobile unit communicates with only one base station at a time. However, since all transmissions in a CDMA system take place on the same frequency spectrum, a mobile unit actually has available all of the information which is within its range. However, it only decodes information on PN offsets and Walsh code channels which are directed to it. A CDMA mobile unit uses a receiver which is able to apply a number of decoding masks simultaneously at different offsets of the entire spectrum of information which it receives. At present, a mobile receiver may decode as many as six PN offsets at once. However, usually only three PN offsets are used to decode messages while the others decode control information. Because a mobile unit in a CDMA system may be receiving the same information from a number of different base stations at the same instant, it may decode information from a single message sent to it from a number of different base stations simultaneously using different PN offsets and Walsh codes and combine that information to produce a single output message. Thus, while a signal transmitted from one base station may be fading, the same message may be being received with adequate strength from another base station. This allows a CDMA system to offer the possibility of significantly better transmission. The situation in which a mobile is communicating with a number of base stations at once is called "soft handoff."

In order to utilize the advantages offered by CDMA technology, a mobile unit must be able to select the correct base stations with which to communicate. However, it is much too slow for a mobile unit to interrogate each of the 512 PN offsets in order determine those base stations with which it should be communicating. Consequently, a mobile unit uses a "neighbors list" which specifies those PN offsets at which transmissions are most likely to occur in order to reduce the time required for its search for transmissions. A neighbors list is furnished by a base station with which a mobile unit is in contact.

The method by which a mobile unit decides whether to make contact with a particular base station is quite complicated. The mobile unit continuously monitors the strength of signals broadcast on the pilot channel by the base stations to try to utilize the highest quality signals possible. The pilot signals for base stations with which the mobile unit is presently in contact are monitored most frequently, followed by pilot signals for base stations on the neighbors list, followed by pilot signals for all base stations as a group. When the strength of the pilot signal from a particular base station rises above a certain threshold level ($T_{add}$) with respect to the level of all signals being received by the mobile (the interference received in spite of encoding), the mobile issues a request to the system and, upon direction, one of the receiving elements is allotted to that base station.

This is called putting the base station on the active list. When the strength of the pilot signal from a base station falls below another threshold level ($T_{drop}$) with respect to the level of all signals being received by the mobile for a set period, the mobile issues a request to the system and, upon direction, the base station is removed from the active list so that the receiver may be allotted to another stronger base station. Moreover, if a pilot signal is stronger than the weakest pilot signal of a base station in the active set, the mobile issues a request to the system and, upon direction, the stronger base station will replace the weaker base station.

In order for a system operator to allocate resources to a CDMA system intelligently, the operator typically models the system to determine where changes should be made. One of the criteria which is important in determining the allocation of resources is a determination of the base stations with which a mobile unit is in contact at any particular location. Most aspects by which the efficiency at which a system is operating depend on this determination since the active list base stations determine the level of signal compared to interference at any location.

Although the actual method by which a determination of the base stations with which a mobile unit is in contact is quite complicated, all prior art models simply assume that any base station providing a pilot signal greater before decoding than some cutoff level with respect to the total of all signals received by the mobile unit will be in active communication with the mobile unit. This leads to incorrect modeling of the system and the incorrect allocation of assets.

Consequently, it is desirable to provide a new process by which the handoff properties of a CDMA cellular system may be modeled so that steps may be taken to improve the system.

SUMMARY OF THE INVENTION

The present invention is realized by a computer implemented process which determines those base stations which most probably communicate with a mobile unit at a particular location, determines a probability for each base station to communicate with a mobile unit based on its actual received signal level compared to the interference level of signals received at the location, computes for each set of base stations a probability of that set of base stations communicating with a mobile unit at the location, sums the probabilities of a base station and any other base station serving together throughout the system for each other base station, and selects from the highest sums of probabilities a list of neighbor base stations for each base station at each location.

These and other features of the invention will be better understood by reference to the detailed description which follows taken together with the drawings in which like elements are referred to by like designations throughout the several views.

BRIEF DESCRIPTION OF THE DRAWINGS

FIG. 5 includes two tables which illustrate probabilities for receipt of signals from possible groups of base stations at a location within a CDMA cellular telephone system.

DETAILED DESCRIPTION

Figure 1:
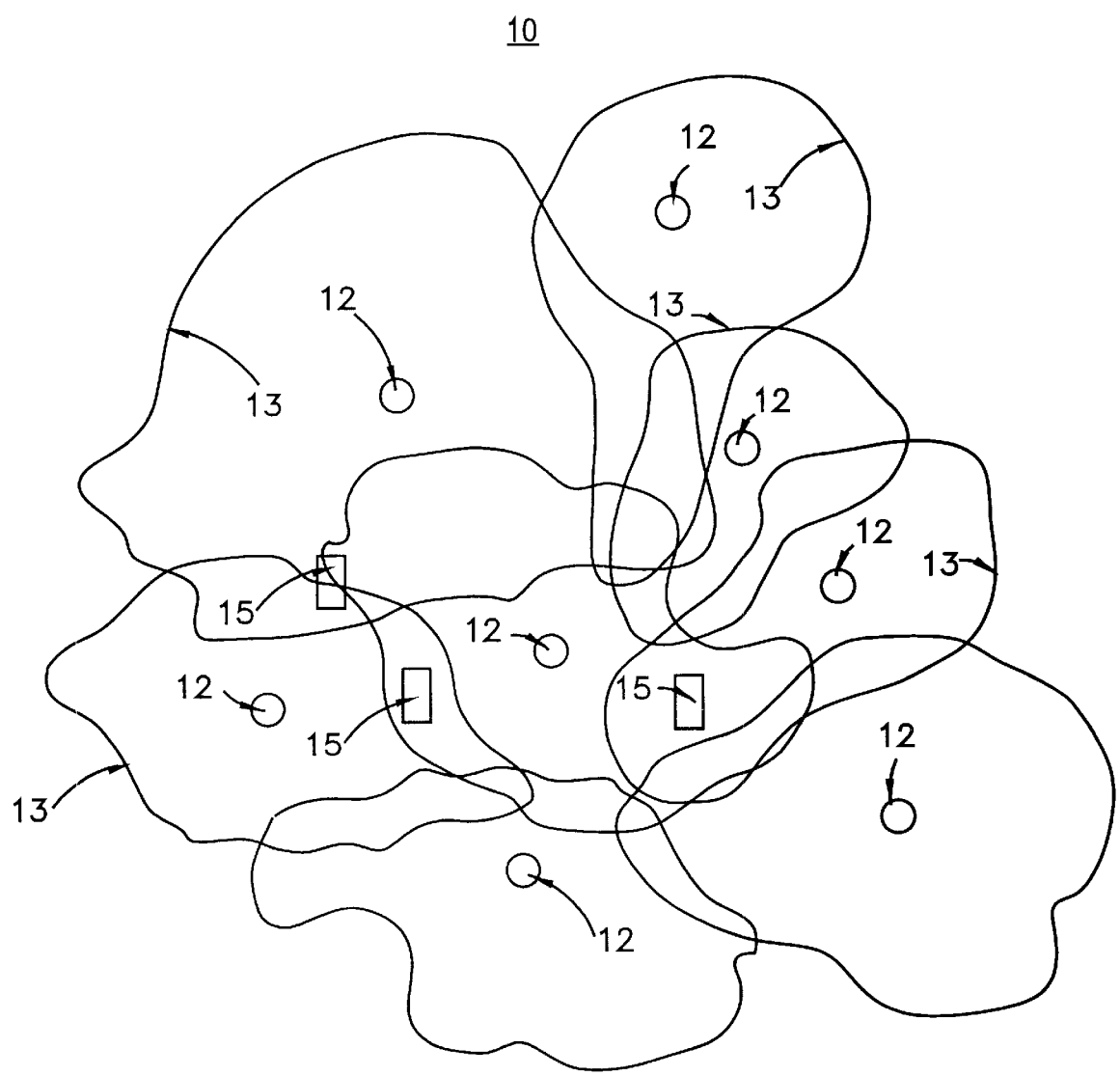
FIG. 1 is a diagram of a portion of a CDMA cellular telephone system.
Figure 2:
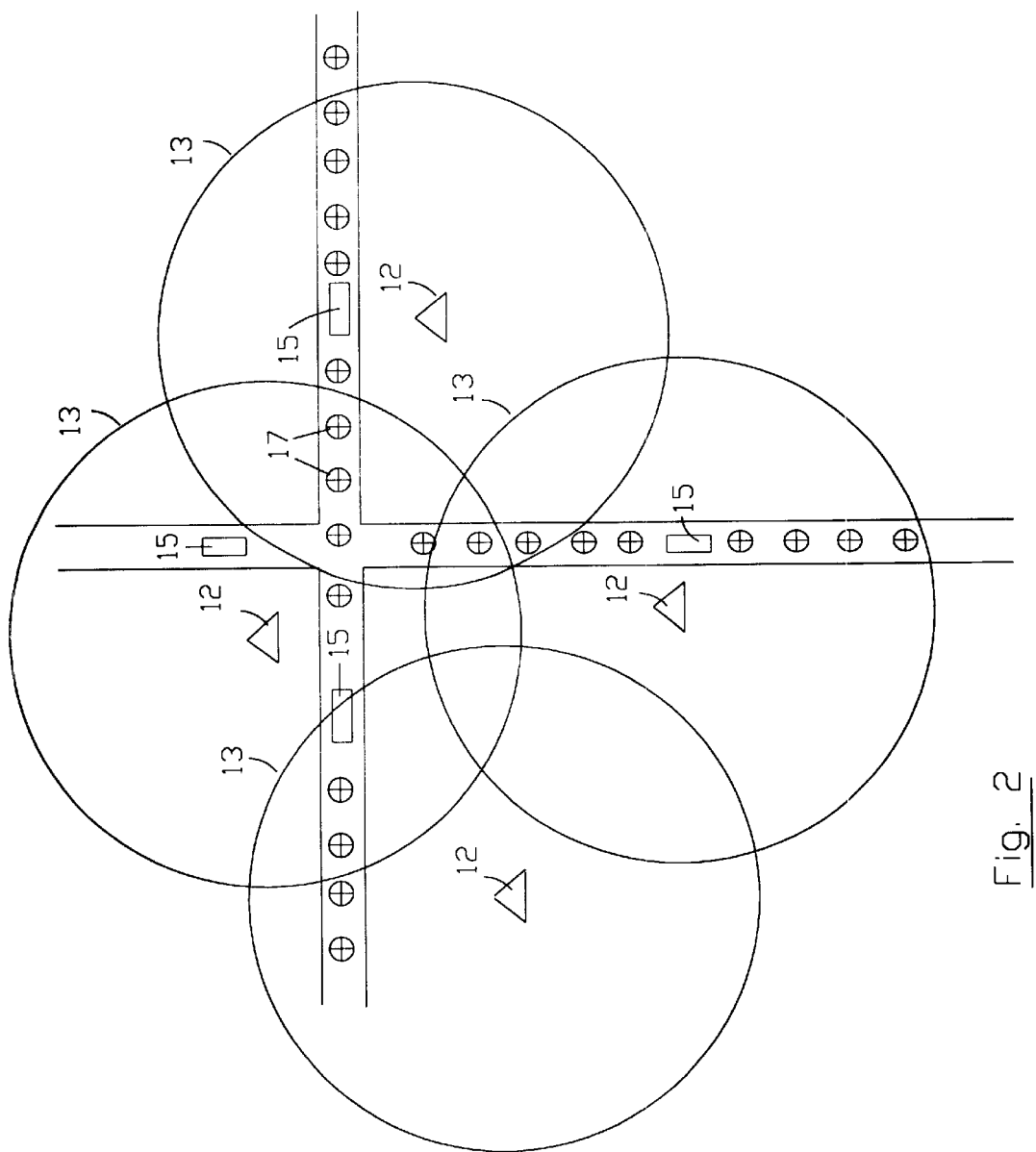
FIG. 2 is another diagram illustrating a portion of a CDMA cellular telephone system.

Referring now to FIG. 1, there is illustrated a portion of a CDMA cellular telephone system 10 which includes a number of individual base stations 12 arranged to provide coverage of a service area. Each base station 12 in FIG. 1 is illustrated having an outer boundary 13 which indicates the effective limit of its communication range. The boundaries 13 of different adjacent base stations typically overlap.

Each of the base stations 12 includes at least one cell which transmits and receives communications with mobile units 15 operating within its service area. In many cases, instead of a single cell, a base station is divided into two or three sectors each of which includes communication equipment for communicating with a number of mobile units in an area defined partially by an antenna pattern angle of 180° or 120°, respectively, from the base station. All transmissions between a base station and mobile units in a CDMA system are digital and are carried on the same "spread spectrum" frequency band of 1.25 MHz. The digital information bits of each message are expanded using various levels of coding information. One such level is called a pseudorandom noise (PN) code. Each base station throughout a system uses the same PN code to encode the information transferred. Each base station identifies itself by using a distinct time offset (generally referred to as a PN offset) from some repeating initial time for applying the PN encoding to any transmission. The intervals between initial times are divided into a total of 512 units. Thus, one base station may begin an encoded transmission at the initial time, a second base station at an offset of one unit from the initial time, a third at an offset of two units, and so on. Typically, base stations physically near one another utilize PN offsets which are widely separated from one another. The initial time and the various offsets are typically established accurately using circuitry such as global positioning system (GPS) circuitry. Since each base station transmits all of its messages using the same PN code at the same PN offset, there must be some way for a mobile unit to detect messages intended for it. To accomplish this, each transmission with a base station is placed on what is effectively a separate channel by further encoding the transmission with one of a plurality of Walsh codes. A message encoded by a Walsh code, like a PN code, is sent and received using a mask of the same pattern so that messages sent using other Walsh codes are orthogonal to the encoding and are canceled out. A transmission on a particular channel is decoded by applying a mask including the Walsh and PN codes to the received pattern of information bits commencing at the PN offset designated for the particular channel.

The CDMA system of transmission offers a number of advantages. One of these advantages is that a mobile unit may be receiving the same message relayed through a number of different base stations at the same time. Since all transmissions take place on the same frequency band, a mobile unit actually receives all of the information which is available within its range but only decodes information on channels which are directed to it. A CDMA mobile unit uses a receiver which is able to apply a number of different Walsh and PN decoding masks at the same instant to the entire spectrum of information which it receives. By knowing the channels which it desires to receive, a mobile unit may decode information from a single message sent to it by a number of different base stations simultaneously and combine that information to produce a single output message. Thus, while a message from one base station may be fading, the same message may be received with adequate strength from another base station. This allows CDMA systems to offer the possibility of significantly better transmission than other systems.

Even with their advantages, CDMA systems do have problems. One of these is caused by the fact that all transmissions occur on the same frequency spectrum. Since all transmissions take place on the same frequency band, a mobile unit actually receives all of the transmissions which are available within its range. Those transmissions which are not directed to the particular receiver act as interference which tends to obscure the desired transmissions. When the level of transmissions (desired and not desired) at the receiver reaches a level (before decoding) greater than approximately 14 dB more than the level of desired signals, it becomes difficult to decode the desired transmissions. This level of signal before decoding translates to approximately 7 dB greater than the interference level after a message directed to a receiver has been decoded.

In order to provide high quality transmissions, CDMA systems include features for automatically increasing and decreasing power levels at the base stations and mobile units in order to maintain the message strength after decoding at a level typically just greater than approximately 7 dB above the level of all interference on the channel.

A mobile unit determines whether the signals received are strong enough by measuring the rate at which errors occur in the decoded signals received (the frame error rate), a factor directly related to the signal-to-interference ratio. When errors rise above a prescribed limit, a mobile unit signals the base station to increase the strength of its signal. The base station does this, but then incrementally decreases the signal strength from the higher transmission level until the mobile unit again signals to raise the strength. Thus, when the signal falls to a level where the frame error rate becomes too high, indicating a strength below approximately 7 dB greater than the interference level after decoding, the base station automatically increases the power of the signal being transmitted thereby raising the received signal level with respect to interference and increasing the signal quality.

In a similar manner, a base station measures the strength of signals received from a mobile unit by monitoring frame error rate and indicates to the mobile unit whether to raise or lower the strength of its transmission. When a mobile unit is in contact with a number of base stations, the mobile unit receives signals from each of the base stations indicating whether to raise or lower its transmission strength with respect to that base station. As long as there is one base station signaling the mobile unit to lower its transmission strength, the mobile unit ignores any signal to increase and responds instead to the signal to lower the strength of its transmission since a single strong signal is sufficient to provide interference free service for the mobile.

It is very useful to be able to evaluate the quality of service in a CDMA service area in order to enhance the operation of the system. To do so with any precision requires that those base stations which can best serve any particular location throughout the system be known. Unless these base stations are known, it is impossible to understand the operation of the system. For example, without knowing the base stations with which a mobile unit at any location should be in contact, it is impossible to know transmit power levels, interference levels, and similar characteristics of the system.

Figure 3:
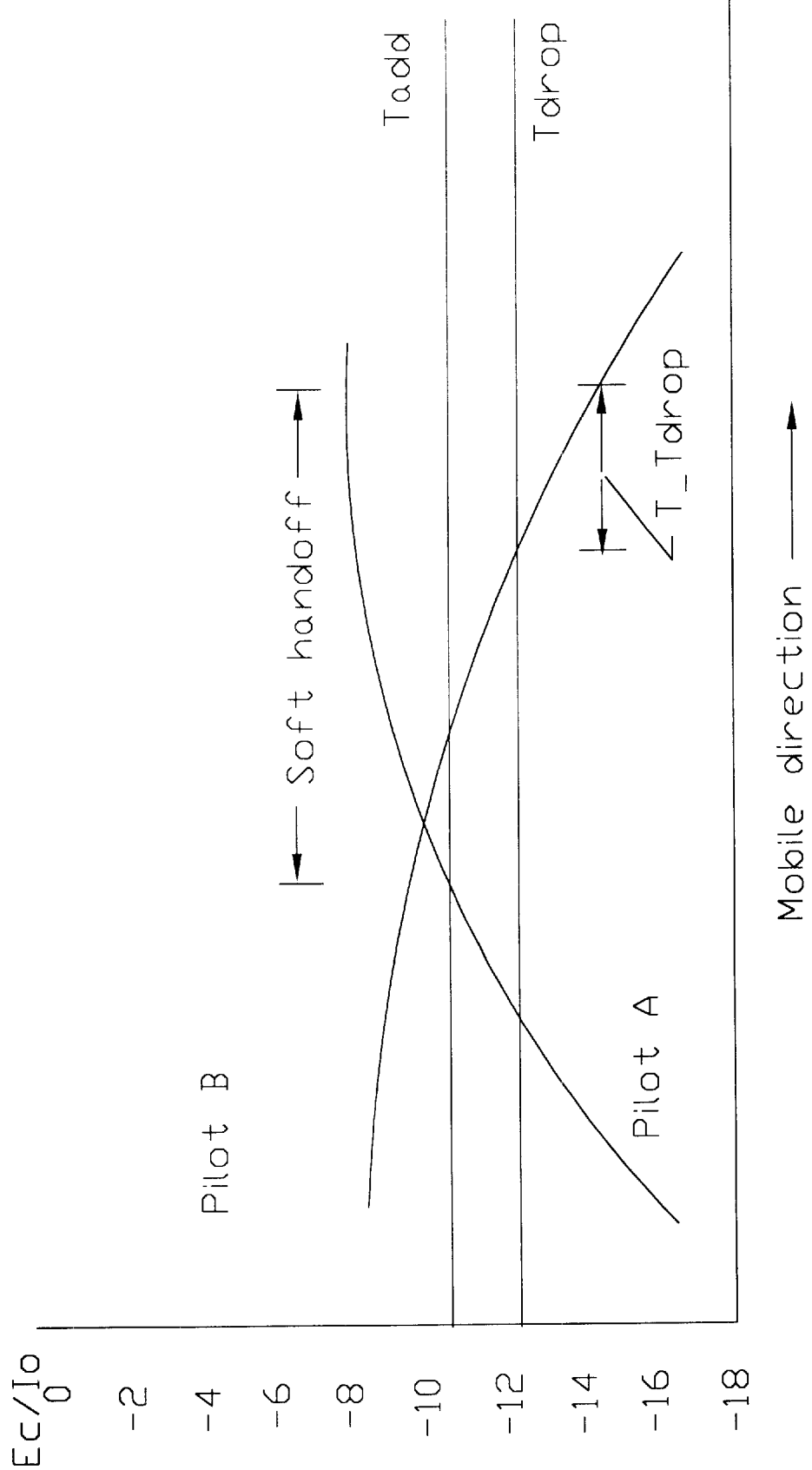
FIG. 3 is a diagram useful in describing handoff criteria in a CDMA cellular telephone system.

All prior art methods of evaluating a CDMA system to determine the base stations which might be serving a particular location within the system have utilized one of a number of different cutoff levels to evaluate signal strength. If a signal received by a mobile unit from a base station is stronger than this cutoff level before decoding, then the base station is presumed to be serving the location. As will be understood, a single cutoff level of any sort evaluated before decoding does not accurately represent the actual evaluation made by a mobile unit in deciding whether to add or drop a particular base station from its active server list. First, signals evaluated before decoding provide only a vague approximation of the actual signal-to-interference ratio after decoding. Second, a single threshold does not represent the complicated handoff characteristics of a CDMA system described above in detail and illustrated in FIG. 3. Consequently, none of these prior art determinations allows an accurate determination of system characteristics.

The present invention provides a process for evaluating accurately those base stations which best serve any location in a CDMA system so that an operator may take steps to enhance the quality of service.

In order to evaluate any system, data relating to that system is first gathered. This may be the same data gathered for use in an AMPS or TDMA system utilized in the same area as the CDMA system. Or it may be data accumulated specifically for determining the quality of CDMA service in the service area. In any case, the specific data utilized is data indicating transmitted signal strength of a transmission at a base station, received signal strength of the transmission at a location, and the location of receipt, recorded for locations throughout the system.

Figure 8:
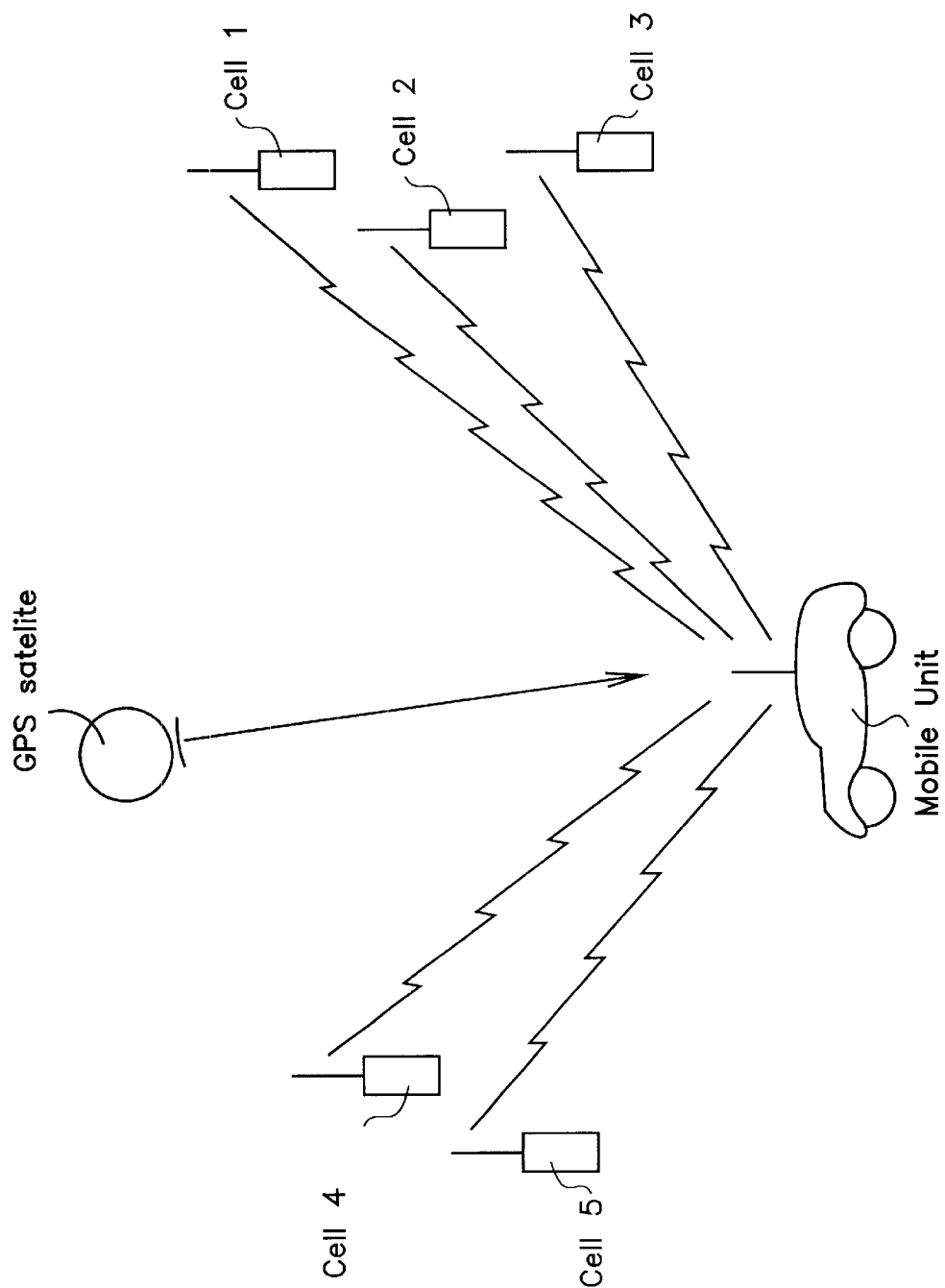
FIG. 8 illustrates a mobile unit equipped for gathering data to be used in carrying out the process of the invention.

In a CDMA system, data is gathered by drive tests using a special receiver called a PN scanning receiver which is capable of receiving signals at a level typically as great as 21 dB below the total received signal strength. A PN scanning receiver is associated with a global positioning system (GPS) receiver and a computer within a test vehicle. The test vehicle drives the roads of the system 10 as the PN scanning receiver automatically produces measurements at regular intervals (typically every one to five seconds). At each measurement interval, the receiver measures the total signal strength of all signals received and the strength of each pilot signal received from any base station. These values are stored by a computer usually in the test vehicle along with time and position values which are furnished by the GPS receiver. FIG. 8 illustrates a mobile unit equipped for such data gathering.

Once the data has been gathered describing the system, this data is used to provide the evaluation. It should be noted that in contrast to prior art system evaluation methods, the present invention utilizes data acquired through actual measurements of the system thereby eliminating the need to guess at values provided by terrain models.

The pilot signals generated by a base station on the pilot channel are transmitted at a constant power throughout the system. Since transmission power is the same, a mobile unit may compare the strength of pilot signals received from different base stations against one another. The known transmission level also allows a determination of the path loss for any transmission from a base station which has been received by a mobile unit at the location. This path loss value, the received pilot strength from each discernible base station, and the total received strength of all signals at the location are recorded for each location in the system. For this purpose, a received pilot signal strength lower than some cutoff level is considered to be non-discernible by the mobile.

Figure 4:
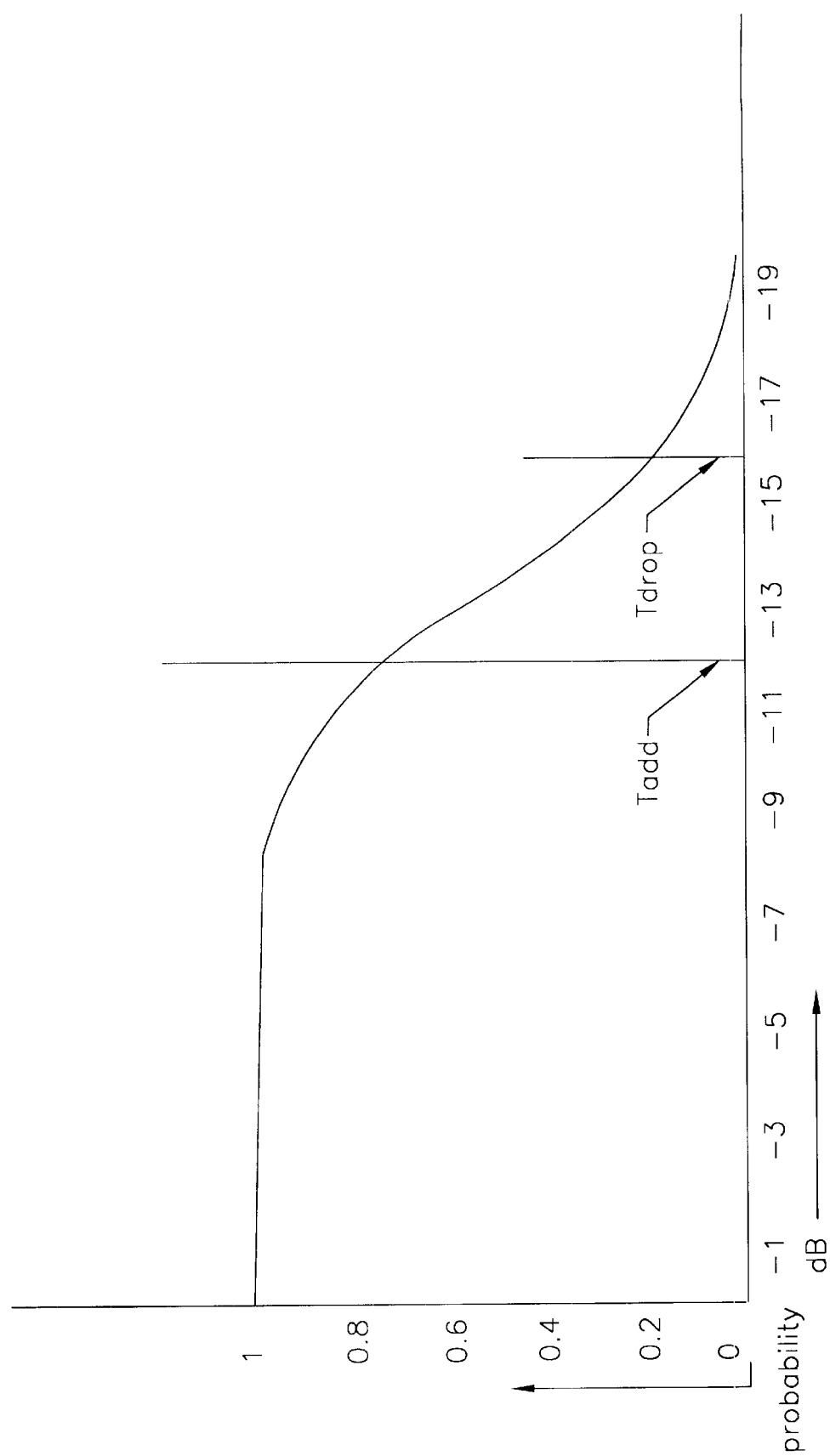
FIG. 4 is a curve used to evaluate the probability that a base station providing a received signal with a strength-to-interference level ratio will serve a particular location in a CDMA cellular telephone system.
Figure 7:
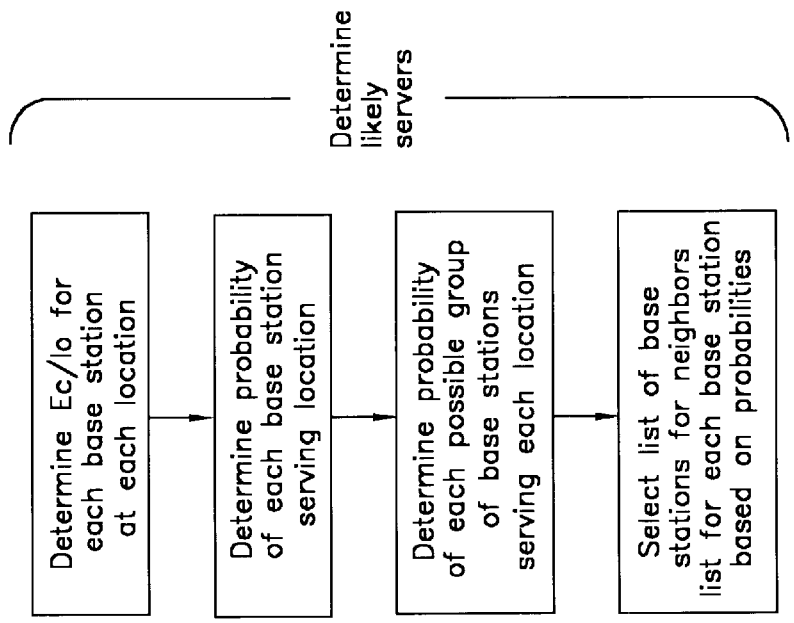
FIG. 7 illustrates in more detail a portion of the process of FIG. 6.
Figure 6:
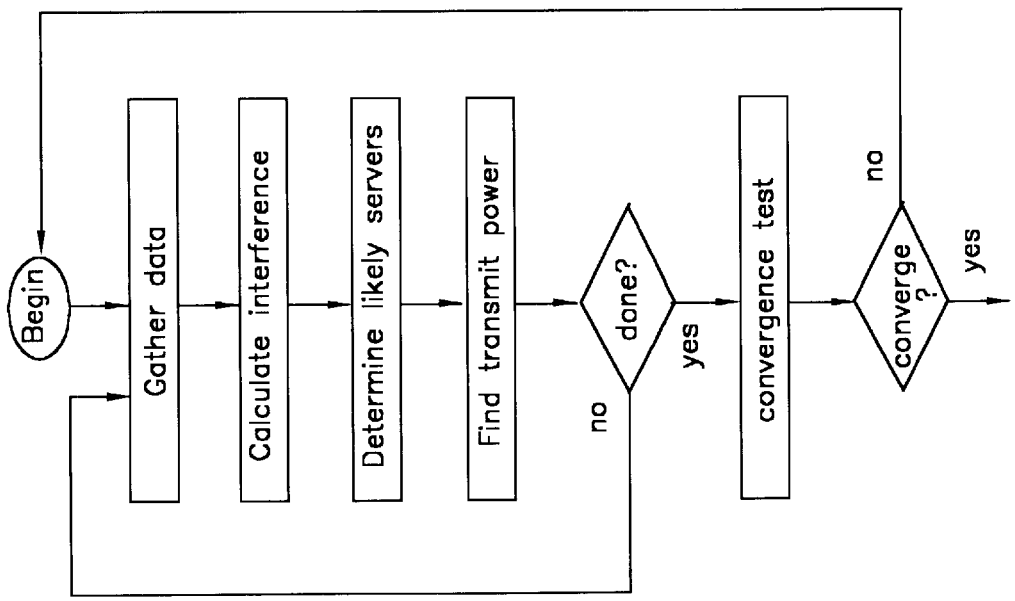
FIG. 6 illustrates a process in accordance with the present invention.

In order to determine which base stations may be serving a location (be on the active list), a probabilistic test is applied in accordance with the present invention in the manner illustrated in FIG. 6. Utilizing a probability curve such as that shown in FIG. 4 (derived from data for the system) which evaluates the likelihood of a base station providing a received signal having a particular ratio of signal-to-interference level (Ec/Io) serving a particular location, the probability of each individual base station serving the location may be determined. For any location, the Ec/Io ratio may be determined with respect to each base station by dividing the strength of the pilot signal received before decoding by the total received signal strength (total interference) at the location. It has been found that on an average pilot signals are received from two base stations at each location. Where more than one base station provides a discernible pilot signal at a location, the probability for each of the individual base stations is determined. Then, the probability for each possible group of the base stations from which discernible signals have been received may be obtained by multiplying the probabilities for each individual base station being received in the group by the probabilities of all others in the group and by the probabilities that all base stations not in the group will not be received. This is illustrated for a group of four base stations providing discernible pilot signals by the table in FIG. 5. This table shows at each of its intersections the probability for the particular group of base stations to serve the location.

For example, in FIG. 5, the different pilot signals are assigned exemplary values with pilot A which is the strongest having a ratio (Ec/Io) of 8 dB below all interference while each of the other pilots is incrementally weaker and has a lower ratio. From the exemplary graph of FIG. 4, the probabilities (p(X)) for each of the individual base stations generating pilot signals A–D are determined and placed in the p(X) column of FIG. 5 for the row designating the particular pilot. These values are rationalized in the column labeled pn(X) for one embodiment of the invention to provide for the condition in which only three channels carrying voice signals may be received at once. Then in the second portion of the figure, the values at the intersections of the rows and columns are the final probabilities for pilots indicated at the beginning of each row and column. In the figure, an accent indicates that the particular pilot is absent.

From this, a list of possible base stations ranked in order of probability is obtained at each location considering any one of the base stations capable of serving that location. To determine the probability that any individual base station will serve an area of coverage defined by the outer limit 13 in FIG. 1 of a primary base station, the probability for each of the groups in which the primary base station and the other base station are included are summed. For example, in FIG. 5, the probability for each of the groups including the base stations A and B may be determined. This sum provides a number for the location. When all of the locations in the area of coverage are summed, a total probability number for each particular base station is realized. Thus, in determining a neighbor list for base station A, the probability of base station A serving that location with each of the other possible base stations (e.g., A and B, A and C, A and D) provides a list of neighbor stations based on the pure probability of each other possible base station serving the location together with base station A.

Once the base stations serving a location are identified, the transmitted signal strength necessary to provide a quality signal is calculated for each base station. Each base station is capable of adjusting the transmitted signal strength to maintain a quality signal with a mobile. The quality signal level is determined by an Eb/No value which measures the energy received at the location from the intended signals versus the total interference received, both measured after decoding. This calculation is repeated for each group of base stations with a probability of serving a location. In determining the transmit power necessary to produce a quality signal, an average transmit power may be computed by weighting the received signal strength by the probability that a signal will be received at the location from the base station. If then, the transmit power determined for each location throughout the system is summed for the base station, a total transmit power will be determined.

The process (shown in FIG. 6) of computing base stations, probabilities of serving a location, and required transmitter power of each base station continues for each location in the system (or portion of the system) for which the modeling is being done until values are determined for all positions. When a first round of computations has been completed, the new values determined during the first round for each received signal strength necessary to provide a quality signal at a location and each transmit strength required at a base station providing such a quality signal at the location are utilized in a second round of computations. That is, the increases in the values of received signals at the locations and the signals transmitted from the base stations are utilized to determine at each location a new total received signal value. An increase in received signal value may be determined for each location by adding the incremental increases in individual received signal values to the total values previously computed.

The new total received signal strength at each location is used with the received signal strength of individual pilot signals to calculate Ec/Io and determine new probabilities of serving the location in the manner discussed above. Then the probability for each possible group of base stations is computed in the manner described. Finally, new transmitted signal strengths from individual base stations necessary are computed by determining received signal strength to provide the required mobile Eb/No at the location. It is probable that for many locations, transmission strength for certain base stations must be increased again because the increase in transmission strength required by the first round computations raises the total received signal strength at most locations thereby requiring that the received signal strength from many base stations be increased to maintain the Eb/No required for quality service.

At some point in the modeling process, the increase in the level of signal strength transmitted by all of the base stations and the increase in interference level at each location in the system will equalize so that additional rounds of computation will have little real effect on the interference in the system. When any round of computations for all of the locations has been completed, a test is conducted to determine the change in total transmitted signal strength since the beginning of the round of computations. If the level is less than a predetermined level selected for the particular system to determine when the change has become too small to matter, the modeling is considered to be complete. This is sometimes called convergence in this specification. The values determined for each of the necessary transmission powers, the base stations defined by those powers, and the most probable of base stations or groups of base stations to serve any location in the system are those determined on the last round of computations before the equalization test is met.

With these values for each location throughout a CDMA system modeled, a neighbor list may be prepared for each sector. Using the data accumulated for each location to determine the probabilities of different base stations serving the location, the probability of any base station having a particular area of coverage and any other particular base station both serving a location within that area of coverage may be found at each location throughout the system.

This is accomplished by determining the probability for each possible group of base stations of all the base stations capable of serving a location within the area of coverage which group includes the base station having the area of coverage and the other base station of interest. The probability for each group is the product of the probability of each base station in the group serving the location multiplied by the probability that each base station not in the group which might serve will not serve the location. These are the probabilities shown in the right hand portion of the table in the example of FIG. 5. The probabilities of each group including the two base stations are then summed to provide the probability that the two base stations will serve the location. Then, the probabilities of that base station and the other particular base station both serving locations in the area of coverage of the primary base station are summed for all locations in the area of coverage. Similarly, the probability of each of these pair groupings for any base station and each other base station which serves any particular location may be determined and summed throughout the system to produce for each area of coverage by a base station a list of probabilities for the base station and any other base station capable of serving the area of coverage. The result are numbers that sum the probabilities of the base station and each other base serving any location which the base station serves.

Selecting a list beginning with the highest sum of probabilities and moving toward incrementally lower sums of probabilities until a sufficient number of neighboring base stations have been selected for the capabilities of the system will provide a neighbor list which for each base stations includes only those other base stations most likely to actually provide service at each location served. It should be noted that the final values are weighted by the number of locations at which any particular base station is capable of communicating with a mobile unit within the area of coverage. This, in effect, then gives precedence to base stations which cover a wider area of a sector served by a primary base station. Such a weighting is especially useful in a new or sparsely utilized system in which the effects of loading have not yet been determined or are not yet important.

On the other hand, in many situations various areas of a system handle much larger amounts of traffic than do other areas. In such a case, it is desirable to be able to take the system usage into consideration. The present invention allows this. By assigning usage factors to each location so that areas experiencing heavier traffic are more heavily weighted, usage may be taken into account. Thus, for example, it may be assumed that a particular location will have traffic which averages of one-tenth of a user at all times while another location will have some lesser amount of traffic. By weighting the probabilities (e.g., multiplying the probability that $1/10$ of a user is present) for each individual base station by the usage factor for the location, the sum of probabilities obtained will be similarly weighted by the usage factor. This usage factor may also be utilized to determine the effect of different levels of usage at different times.

This same usage weighting, it should be noted, may be used in calculating transmit power required to produce a quality signal at locations. For example, since the transmit power may be determined in the process by multiplying the received signal power by the probability that the location will be served by the particular base station for each location and then adding the loss in transmission, the transmit power for the location may also be determined based on the usage factor. By weighting the received signal power by both the probability and the usage factor at each location and then summing the transmit power for each sector, a more accurate transmit power may be determined for the base station.

Another manner in which a neighbor list may be determined once the probabilities have been determined and numbers assigned in the manner described above is by including in the neighbor list any base station which has a number larger than some preselected level. This has a tendency to include base stations in the list based on area of coverage and assurance of a particular level of signal thereby eliminating from a group most likely to serve those base stations with little chance of actually providing service. Levels may be used along with probabilities and usage factors for computing each of the other criteria used in determination of the neighbor list.

Probabilities determined for groups of base stations serving a location may also be utilized to determine interference level at a location. For example, instead of simply totaling all signals received at a location, the values of received signals from each location in a group may be summed and weighted by the probability that that group of base stations will serve the location. Then the results for all of the groups received at a stations may be combined to provide an interference level.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A process for selecting a neighbor list in a CDMA system comprising the steps of:
   determining a set of base stations consisting of all base stations able to communicate with a mobile unit at a location based on received signal power level from the base station compared to a power level of all signals received at the location,
   determining a probability of communication at said location for each base station within said set of base stations able to communicate with a mobile unit at a location,
   identifying each possible combination of one or more base stations from said set of base,
   computing a probability of communication at said location for each said possible combination of base stations based upon said probability of communication for each of said base stations in said combination determined in light of the probability of communication of the remainder of said base stations in said set, and
   compiling from said computed probabilities of said combinations, a neighbor list for each base station indicating the relative probability of each base station serving a location relative to each neighbors on the list.

2. A process as claimed in claim 1 in which the step of determining a probability of communication for each base station able to communicate with a mobile unit at a location comprises determining a ratio of received signal power level from the base station to total interference at the location.

3. A process as claimed in claim 1 in which the step of determining a probability of communication for each base station able to communicate with a mobile unit at a location comprises comparing a ratio of received signal power level from the base station to total interference at the location with a curve comparing the ratio to a probability of receipt of signals.

4. A process as claimed in claim 1 in which the step of determining a probability of communication for each base station able to communicate with a mobile unit at a location comprises selecting a neighbor list for each base station from the most probable of the base stations and groups.

5. A process as claimed in claim 1 in which the step of computing a probability of communication of each possible combination of base stations combination is based on actual power level of each base station in the set as compared to the interference level of signals received at a location.

6. A process as claimed in claim 1 in which the step of computing a probability of communication of each possible combination of base stations in a set of all base stations able to communicate with a mobile unit at the location includes summing probabilities for a serving base station together with any other serving base station throughout the system.

7. A method as claimed in claim 6 in which a sum of probabilities depends on a number of locations mutually served by a base station and any other base station throughout the system.

8. A method as claimed in claim 6 in which a sum of probabilities depends on an average number of users at each location mutually served by a base station and any other base station throughout the system.

9. A method as claimed in claim 7 including the further step of determining a neighbor list for a first base station from base stations which serve more than a single location in common with said said first base station, wherein said number of commonly served is greater than a threshold number of mutually served locations.

10. A method as claimed in claim 9 in which the step of determining a neighbor list for a first base station a predetermined number of base stations with a greatest number of mutually served locations.

11. A method as claimed in claim 9 in which the step of determining a neighbor list for said first base station includes selecting a predetermined number of base stations with a greatest number of mutually served users.

12. A method as claimed in claim 7 including the further step of determining a neighbor list for a first base station from base stations which serve more than a single location in common with said first base station, wherein said number of commonly served is greater than a threshold number of mutually served users.

13. A method as claimed in claim 1 in which the step of determining said set of all base stations able to communicate with a mobile unit at a location, includes the steps of:
    calculating interference at each location from signal levels received at the location,
    determining necessary received signal level at each location for a quality signal,
    computing a new transmit power for each of said base stations to produce a necessary received signal level,
    determining new signal levels through measurement or modeling based upon said new transmit powers and
    repeating the steps until a change in interference is less than a predetermined amount.

14. A method as claimed in claim 13 in which the step of computing transmit power for base stations to produce necessary received signal level utilizes the probability of a base station serving a location weighted by an average number of users at a location.

15. A method as claimed in claim 13 in which the step of computing transmit power for base stations to produce necessary received signal level sums average transmit levels for a base station to serve a number of locations to determine a total average transmit level for a base station.

16. A method as claimed in claim 13 in which the step of calculating interference at each location from measured signal levels received at the location includes the steps of:
    summing received signal levels for each group of base stations serving a location,
    weighting a resulting sum by a probability of the group of base stations serving the location, and
    summing a resulting value for each group of base stations serving a location to produce an average interference level at a location.

17. A process as claimed in claim 13 in which the step of computing transmit power for base stations to produce necessary received signal level includes:
    utilizing the probability of a base station serving a location weighted by an average number of users at a location to determine a transmit level for a base station for each location in the system,
    comparing a difference in sector transmit power between two successive iterations and determine convergence when the difference falls below a specified threshold.

* * * * *